US009098763B2

(12) United States Patent
Lu et al.

(10) Patent No.: US 9,098,763 B2
(45) Date of Patent: Aug. 4, 2015

(54) ENCODED INFORMATION READING TERMINAL WITH REPLACEABLE IMAGING ASSEMBLY

(75) Inventors: Jun Lu, Jiangsu (CN); Yong Liu, Jiangsu (CN); Xi Tao, Jiangsu (CN); Feng Chen, Suzhou (CN); Ynjiun Paul Wang, Cupertino, CA (US)

(73) Assignee: Honeywell International Inc., Morristown, NJ (US)

( * ) Notice: Subject to any disclaimer, the term of this patent is extended or adjusted under 35 U.S.C. 154(b) by 0 days.

(21) Appl. No.: 14/396,463

(22) PCT Filed: May 8, 2012

(86) PCT No.: PCT/CN2012/075164
§ 371 (c)(1),
(2), (4) Date: Oct. 23, 2014

(87) PCT Pub. No.: WO2013/166647
PCT Pub. Date: Nov. 14, 2013

(65) Prior Publication Data
US 2015/0136854 A1    May 21, 2015

(51) Int. Cl.
*G06K 7/10*    (2006.01)

(52) U.S. Cl.
CPC ........ *G06K 7/10722* (2013.01); *G06K 7/10851* (2013.01)

(58) Field of Classification Search
CPC ................... G06K 7/10881; G06K 19/06046; G06F 1/1684
USPC ............................... 235/454, 462.24, 462.44, 235/472.01–472.03
See application file for complete search history.

(56) References Cited

U.S. PATENT DOCUMENTS 5,828,052 A * 10/1998 Reynolds et al. ........ 235/472.01
8,196,833 B2 * 6/2012 McGill et al. ............ 235/462.01

* cited by examiner

*Primary Examiner* — Seung Lee
(74) *Attorney, Agent, or Firm* — Additon, Higgins & Pendleton, P.A.

(57) ABSTRACT

An encoded information reading (EIR) terminal can comprise a microprocessor communicatively coupled to a system bus, a memory, a communication interface, and a pluggable imaging assembly identified by a type identifier and configured to acquire an image comprising decodable indicia. The imaging assembly can comprise a two-dimensional image sensor configured to output an analog signal representative of the light reflected by an object located within the field of view of the imaging assembly. The EIR terminal can be configured to output, by processing the analog signal, the raw image data derived from the analog signal and/or a decoded message corresponding to the decodable indicia. The imaging assembly can be communicatively coupled to the system bus via an imaging assembly interface comprising a plurality of wires and a multi-pin connector. The imaging assembly interface can comprise one or more wires configured to carry the imaging assembly type identifier. The EIR terminal can be configured, responsive to receiving the type identifier via the one or more wires, to retrieve from the memory one or more imaging assembly configuration information items corresponding to the type identifier and/or to receive via the communication interface one or more imaging assembly configuration information items corresponding to the type identifier. The EIR terminal can be further configured to control the imaging assembly using the imaging assembly configuration information items.

16 Claims, 5 Drawing Sheets

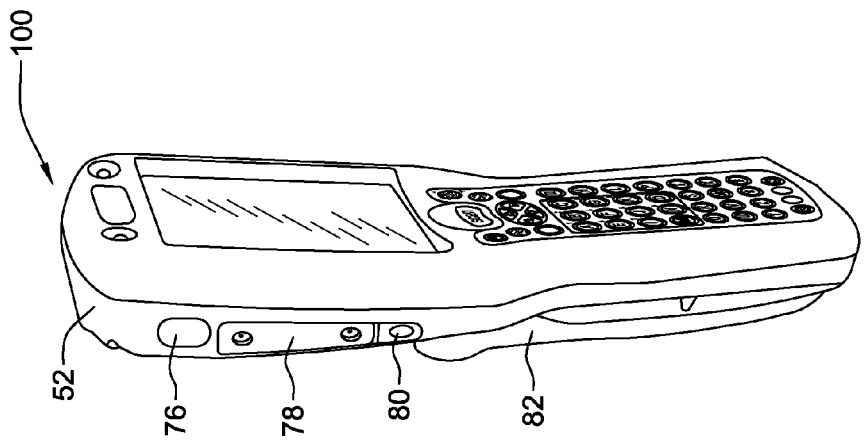
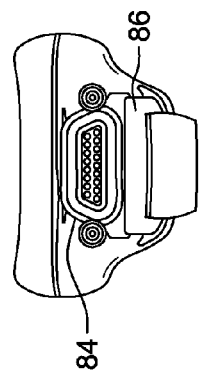
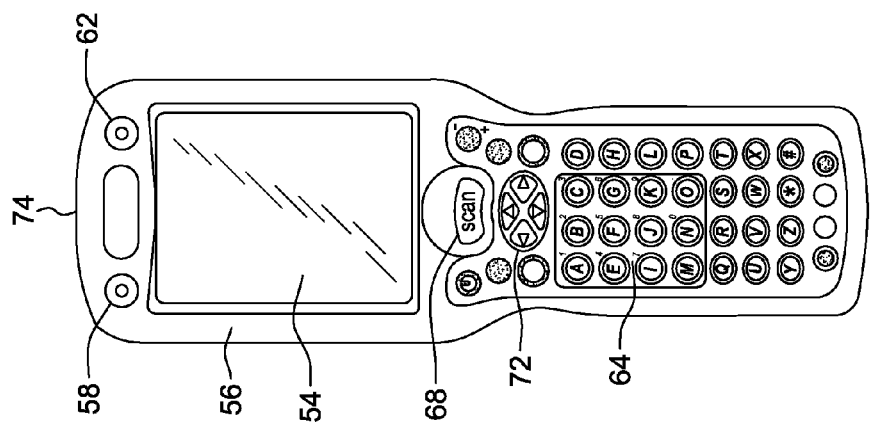

| Image sensor type identifier | Parameter name | Parameter value |
|---|---|---|
| Type1 | PixelRes | 640x480 |
| Type1 | PowerUp Sequence | 0x0acdfb81 |
| Type 2 | PixelRes | 1024x768 |
| Type 2 | | |
| Type2 | | |
| . | | |
| . | | |
| . | | |

FIG. 3a

<?xml version="1.0"?>
<SensorType SensorTypeID="Type1">

<SensorParam paramName="ExposureTime" paramValue="AUTO" />

<SensorParam paramName="PixelRes" paramValue="640x480" />
</SensorType>

<SensorType SensorTypeID="Type1">

<SensorParam paramName="PixelRes" paramValue="640x480" />
</SensorType>

FIG. 3b

ENCODED INFORMATION READING TERMINAL WITH REPLACEABLE IMAGING ASSEMBLY

FIELD OF THE INVENTION

This invention relates generally to encoded information reading (EIR) terminals and, more specifically, to EIR terminals comprising a two-dimensional image sensor.

BACKGROUND OF THE INVENTION

The use of decodable indicia, such as bar code symbols, for product and article identification is well known in the art. Presently, various types of encoded information reading (EIR) terminals have been developed, such as hand-held bar code scanners, hands-free scanners, bi-optic in-counter scanners, and mobile computers such as personal digital assistants (PDAs). EIR terminals typically utilize a lens to focus the image of the decodable indicia, such as a bar code, onto a multiple pixel image sensor, which is often provided by a complementary metal-oxide semiconductor (CMOS) image sensor that converts light signals into electric signals.

SUMMARY OF THE INVENTION

In one embodiment, there is provided an EIR terminal comprising a microprocessor communicatively coupled to a system bus, a memory, a communication interface, and a pluggable imaging assembly identified by a type identifier and configured to acquire an image comprising decodable indicia. The imaging assembly can comprise a two-dimensional image sensor configured to output an analog signal representative of the light reflected by an object located within the field of view of the imaging assembly. The EIR terminal can be configured to output, by processing the analog signal, the raw image data derived from the analog signal and/or a decoded message corresponding to the decodable indicia. The imaging assembly can be communicatively coupled to the system bus via an imaging assembly interface comprising a plurality of wires and a multi-pin connector. The imaging assembly interface can comprise one or more wires configured to carry the imaging assembly type identifier. The EIR terminal can be configured, responsive to receiving the type identifier via the one or more wires, to retrieve from the memory one or more imaging assembly configuration information items corresponding to the type identifier and/or to receive via the communication interface one or more imaging assembly configuration information items corresponding to the type identifier. The EIR terminal can be further configured to control the imaging assembly using the imaging assembly configuration information items.

In a further aspect, the decoded message can comprise one or more printable characters and/or one or more non-printable characters.

In a further aspect, the imaging assembly can further comprise an analog-to-digital (A/D) converter configured to convert the analog signal into a digital signal, an amplifier configured to output an amplified analog signal by amplifying an analog signal read out of the image sensor, and a control circuit configured to control the imaging assembly.

In a further aspect, the EIR terminal can be further configured to receive the type identifier via the one or more wires responsive to detecting a power up event or an imaging assembly connection event.

In a further aspect, one or more wires configured to carry the type identifier can be provided by an I²C interface.

In a further aspect, the imaging assembly configuration items can a power-up sequence of the two-dimensional image sensor, a format of data outputted by the two-dimensional image sensor, a number of pixels comprised by the two-dimensional image sensor, an exposure mode of the two-dimensional image sensor, and/or configurations of one or more control registers of the two-dimensional image sensor.

In a further aspect, the memory can be provided by at least one of: a volatile memory, a non-volatile memory.

In a further aspect, the communication interface can be provided by a wired communication interface or a wireless communication interface.

In a further aspect, the EIR terminal can be further configured to store one or more imaging assembly configuration items in a memory file comprising one or more records, each record comprising an image sensor type, at least one parameter identifier, and at least one parameter value.

In another embodiment, there is provided a method of controlling an imaging assembly by an EIR terminal comprising a microprocessor, a memory, a communication interface, and a pluggable imaging assembly communicatively coupled to the system bus via an imaging assembly interface comprising a plurality of wires and a multi-pin connector. The method can comprise the step of, responsive to detecting a power up event or an imaging assembly connection event, receiving the type identifier via the imaging assembly interface. The method can further comprise the step of receiving one or more imaging assembly configuration information items corresponding to the type identifier. In one embodiment, the EIR terminal can retrieve the imaging assembly configuration information items from the memory of the EIR terminal. Alternatively, the EIR terminal can transmit a request comprising the type identifier to an external computer and receive the imaging assembly configuration information items from the external computer. The method can further comprise the step of controlling the imaging assembly using the imaging assembly configuration information items. The method can further comprise the step of, responsive to receiving an analog signal outputted by the imaging assembly, converting the analog signal into a digital signal. The method can further comprise the step of outputting, by processing the digital signal, the raw image data derived from the analog signal and/or a decoded message corresponding to the decodable indicia.

In a further aspect, the method can further comprise the step of storing one or more imaging assembly configuration items in a memory file comprising one or more records, each record comprising an image sensor type, at least one parameter identifier, and at least one parameter value.

BRIEF DESCRIPTION OF THE DRAWINGS

The features described herein can be better understood with reference to the drawings described below. The drawings are not necessarily to scale, emphasis instead generally being placed upon illustrating the principles of the invention. In the drawings, like numerals are used to indicate like parts throughout the various views.

FIGS. 1a-1c schematically illustrate one embodiment of the EIR terminal described herein;

FIGS. 3a-3b schematically illustrate data structures for storing and retrieving imaging assembly configuration information for the EIR terminal described herein;

DETAILED DESCRIPTION OF THE INVENTION

Figure 2:
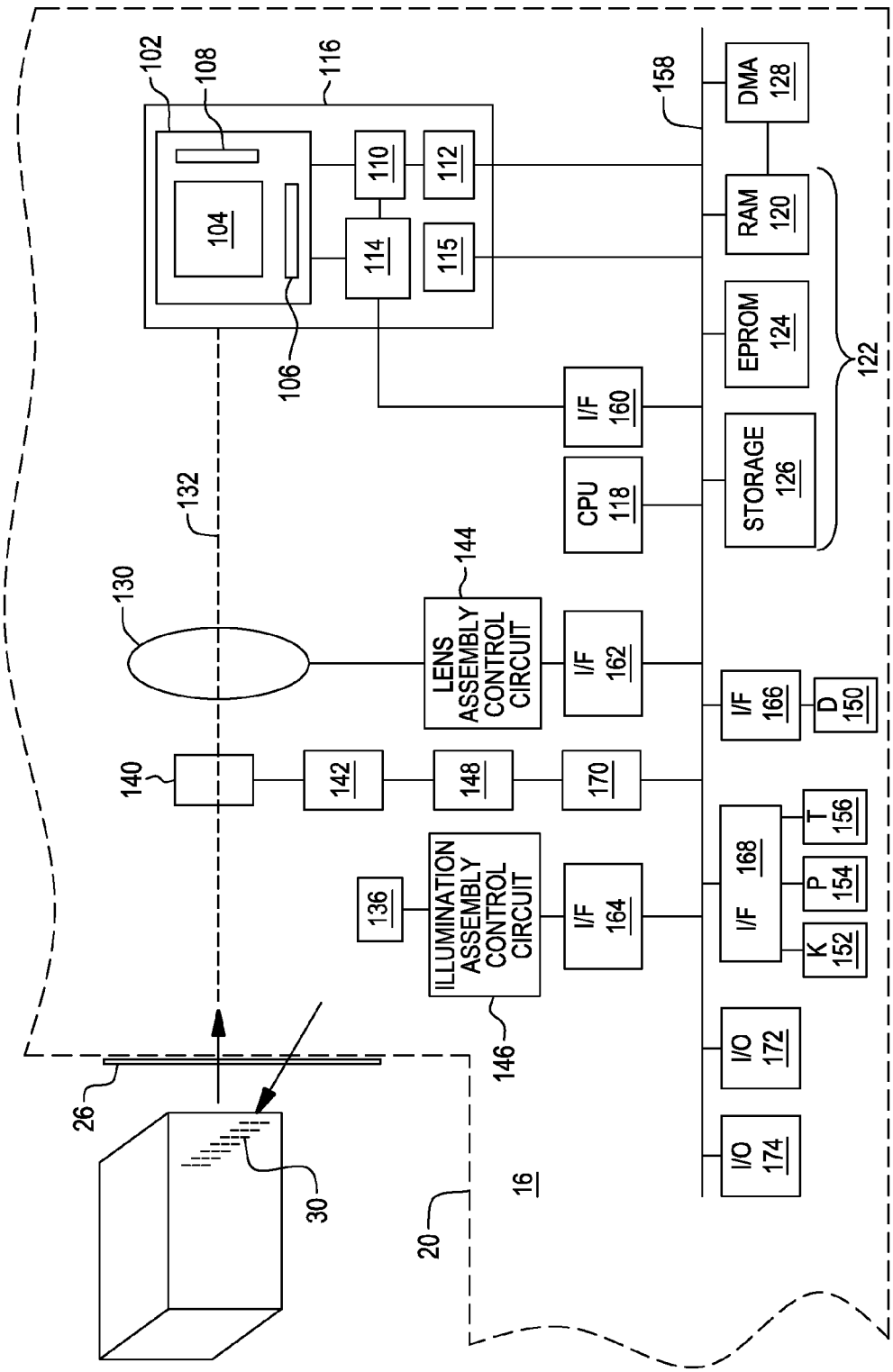
FIG. 2 schematically illustrates a component diagram of one embodiment of the EIR terminal described herein.

In one embodiment, there is provided an encoded information reading (EIR) terminal that can be used, for example, for bar code reading and decoding in point-of-sale (POS) and other applications. A skilled artisan would appreciate the fact that other uses of EIR terminal are within the scope of this disclosure.

A product bearing decodable indicia can be scanned by the EIR terminal. As used herein, "decodable indicia" is intended to denote an encoded representation, such as the representation in a bar code symbology, of a message string comprising alphanumeric and non-alphanumeric characters. Decodable indicia can be used to convey information, such as the identification of the source and the model of a product, for example in a UPC bar code that can comprises six, eight, twelve or thirteen encoded symbol characters representing numerical digits. The EIR terminal disclosed herein can be employed to acquire and decode images of decodable indicia. The EIR terminal can be configured to output raw image data containing decodable indicia and/or a decoded message corresponding to the decodable indicia.

Of course, devices that read bar codes, read RFID, or read cards bearing encoded information may read more than one of these categories while remaining within the scope of this disclosure. For example, a device that reads bar codes may include a card reader, and/or RFID reader; a device that reads RFID may also be able to read bar codes and/or cards; and a device that reads cards may be able to also read bar codes and/or RFID. For further clarity, it is not necessary that a device's primary function involve any of these functions in order to be considered such a device; for example, a cellular telephone, smartphone, or PDA that is capable of reading bar codes is an EIR terminal for purposes of this disclosure.

In a further aspect, the EIR terminal can comprise an imaging assembly. The imaging assembly can in turn comprise a two-dimensional image sensor configured to output an analog signal representative of the light reflected by the physical object located within the field of view of the imaging assembly (e.g., a retail item bearing a bar code label). The imaging assembly can further comprise an amplifier configured to amplify the analog signal read out of the image sensor. The imaging assembly can further comprise an analog-to-digital (A/D) converter configured to convert the amplified analog signal into a digital signal. The imaging assembly can further comprise a control circuit configured to control the imaging assembly by varying the image sensor exposure period, the amplifier gain, and/or other imaging assembly parameters.

In a further aspect, the EIR terminal can comprise a microprocessor programmed to process the digital signals outputted by the A/D converter. The microprocessor can be further programmed to output raw image data derived from the digital signal or a decoded message corresponding to the decodable indicia contained within the acquired image.

Due to operational requirements, the EIR terminal may need to support several types of replaceable two-dimensional image sensors. To facilitate image sensor replacement, the imaging assembly can be made pluggable, i.e., can be communicatively coupled to the system bus of the EIR terminal over an imaging assembly interface comprising a multi-pin electromechanical connector.

In a further aspect, the imaging assembly can be identified by a type identifier which can be stored by the imaging assembly in a non-volatile memory accessible over the imaging assembly interface.

In operation, the EIR terminal can, responsive to being reset or powered-up, receive the imaging assembly type identifier over the imaging assembly interface. The EIR terminal can then retrieve from its memory or receive from an external computer the imaging assembly configuration information which can be used to control the imaging assembly.

One embodiment of EIR terminal 100 is shown in FIGS. 1a (front panel view), 1b (side panel view), and 1c (bottom panel view). EIR terminal 100 can comprise housing 52 within which other components of EIR terminal 100 can be disposed. LCD screen display with touch screen sensor 54 can be disposed on the front panel 56. Also disposed on front panel 56 can be decode LED 58, scan led 62, and keyboard 64 including scan key 68 and navigation keys 72. Imaging window 74 can be disposed on the top panel of housing 52. Disposed on the side panel (best viewed in FIG. 1b) can be infra-red communication port 76, access door to a secure digital (SD) memory interface 78, audio jack 80, and hand strap 82. Disposed on the bottom panel (best viewed in FIG. 1c) can be multi-pin mechanical connector 84 and hand strap clip 86.

While FIGS. 1a-1c illustrate a hand held housing, a skilled artisan would appreciate the fact that other types and form factors of terminal housings are within the scope of this disclosure.

Referring now to FIG. 2, described is a component diagram of the indicia reading terminal 100. Terminal 100 can comprise an imaging assembly 116 including an image sensor 102, such as a CCD image sensor or a CMOS image sensor. Image sensor 102 can in turn comprise a multiple pixel image sensor array 104 having pixels arranged in rows and columns of pixels, column circuitry 106, and row circuitry 108. Associated with the image sensor 102 can be amplifier circuitry 110, and an A/D converter 112 which can convert image information in the form of analog signals read out of multiple pixel image sensor array 104 into the image information in the form of digital signals. Image sensor 102 can also have an associated timing and control circuit 114 for use in controlling, e.g., the exposure period of image sensor 102, and/or gain applied to the amplifier 110. The noted circuit components 102, 110, 112, and 114 can be packaged into a common imaging assembly integrated circuit 116.

In the course of operation of the EIR terminal 100, analog signals can be read out of image sensor 102, converted into a digital form, and stored into a system memory such as RAM 120. A memory 122 of EIR terminal 100 can include RAM 120, a nonvolatile memory such as EPROM 124, and a storage memory device 126 such as may be provided by a flash memory or a hard drive memory. In one embodiment, EIR terminal 100 can include microprocessor 118 which can be adapted to read out image data stored in memory 122 and subject such image data to various image processing algorithms. In a further aspect, microprocessor 118 can be configured to process the image data stored in memory 122 and to output the raw image data and/or to locate decodable indicia within the image and to output a decoded message corresponding to the decodable indicia.

In a further aspect, EIR terminal 100 can include a direct memory access unit (DMA) 128 for routing image information read out from image sensor 102 that has been subject to conversion to RAM 120. In another embodiment, EIR terminal 100 can employ a system bus providing for bus arbitration mechanism (e.g., a PCI bus) thus eliminating the need for a central DMA controller. A skilled artisan would appreciate that other embodiments of the system bus architecture and/or direct memory access components providing for efficient data transfer between the image sensor 102 and RAM 120 are within the scope of this disclosure.

In another aspect, EIR terminal 100 can include an imaging lens assembly 130 for focusing an image of the decodable indicia 30 onto image sensor 102. Imaging light rays can be transmitted about an optical axis 132. Lens assembly 130 can be controlled with use of lens assembly control circuit 144. Lens assembly control circuit 144 can send signals to lens assembly 130, e.g., for changing a focal length and/or a best focus distance of lens assembly 130.

EIR terminal 100 can include various interface circuits for coupling several of the peripheral devices to system address/data bus (system bus) 158. EIR terminal 100 can include interface circuit 160 for coupling image sensor timing and control circuit timing and control circuit 144 to system bus 158, interface circuit 162 for coupling the lens assembly control circuit 144 to system bus 158, interface circuit 164 for coupling the illumination assembly control circuit 146 to system bus 158, interface circuit 166 for coupling the display 150 to system bus 158, interface circuit 168 for coupling keyboard 152, pointing device 154, and trigger 156 to system bus 158, and interface circuit 170 for coupling the filter module control circuit 148 to system bus 158.

In a further aspect, EIR terminal 100 can include one or more I/O interfaces 172, 174 for providing communication with external devices (e.g., a POS cash register computer, a retail store server, an inventory facility server, a local area network base station, or a cellular base station). I/O interfaces 172, 174 can be interfaces of any combination of known computer interfaces, e.g., Ethernet (IEEE 802.3), USB, IEEE 802.11, Bluetooth, CDMA, and GSM.

As noted herein supra, EIR terminal 100 can be adapted to support several types of pluggable imaging assemblies. To facilitate imaging assembly replacement, the imaging assembly can be communicatively coupled to the system bus of the EIR terminal over the imaging assembly interface comprising a multi-pin electromechanical connector. The imaging assembly can be identified by a type identifier which can be stored by the imaging assembly in a non-volatile memory 115 accessible over the imaging assembly interface.

In a further aspect, the imaging assembly interface can comprise one or more wires configured to carry digital signals outputted by A/D converter 112. The imaging assembly interface can further comprise one or more wires configured to carry digital signals to and from timing and control circuit 114. The imaging assembly interface can further comprise one or more wires configured to carry imaging assembly type information stored in memory 115. In one embodiment, the imaging assembly type information can be carried over an I²C interface communicatively coupled to system bus 158 via an I²C interface controller (not shown in FIG. 2).

As noted herein supra, in operation, EIR terminal 1000 can, responsive to being reset or powered-up, receive the imaging assembly type over the imaging assembly interface. The EIR terminal can then retrieve from its memory or receive from an external computer imaging assembly configuration information corresponding to the imaging assembly type identifier. The imaging assembly configuration information can then be used to control the imaging assembly in the course of operation of EIR terminal 100.

In a further aspect, the imaging assembly configuration information can include, for example, a power-up sequence of the two-dimensional image sensor; a format of data outputted by the two-dimensional image sensor (e.g., raw image, JPEG, YUV422, etc.); the pixel resolution of the two-dimensional image sensor (e.g., 640×480, 1024×768); the exposure mode of the two-dimensional image sensor (e.g., rolling shutter or global shutter); configurations of one or more control registers of the two-dimensional image sensor (e.g., exposure control register, gain control register, etc.)

In one embodiment, the image assembly configuration information can be stored in a look-up table comprising a plurality of records. Each record can comprise an image sensor type identifier, at least one parameter identifier, and at least one parameter value, as schematically shown in FIG. 3a. In a further aspect, each record identified by the image sensor type identifier can comprise a sequence of <name=value> pairs, wherein name represents a parameter name and value represents one or more parameter values. In another embodiment, the image assembly parameters can be stored in an XML file comprising parameter names and values; and example of an XML file is shown in FIG. 3b.

In a further aspect, the look-up table and the XML file can be stored in a volatile or non-volatile memory of the EIR terminal 100. A skilled artisan would appreciate the fact that other methods of storing imaging assembly configuration information are within the scope of the disclosure.

Figure 4:
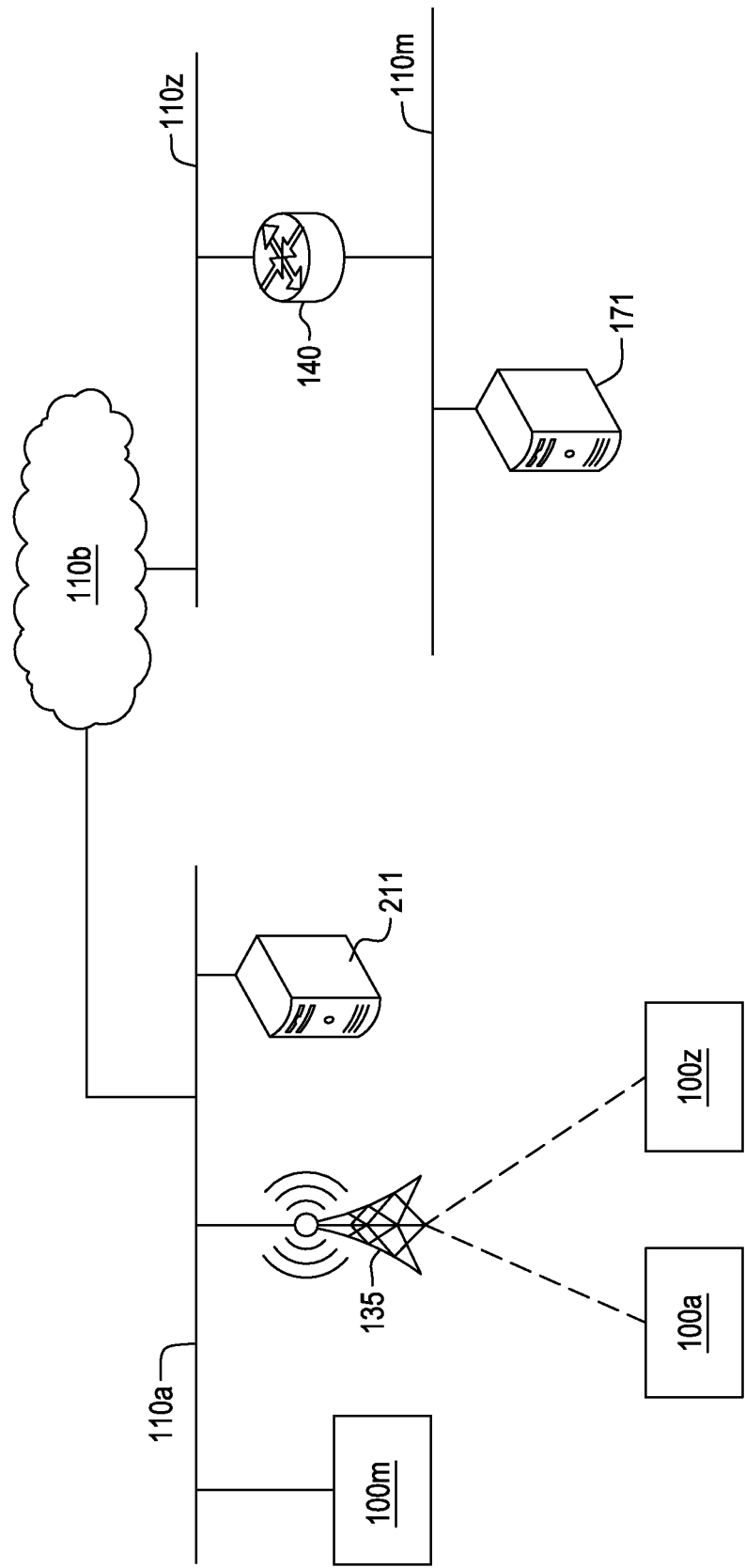
FIG. 4 schematically illustrates a network diagram of one embodiment of a data collection system employing EIR terminals described herein.

In a further aspect, the EIR terminal can be incorporated in a data collection system. One embodiment of the data collection system, schematically shown in FIG. 4, can include a plurality of EIR terminals 100a-100z in communication with a plurality of interconnected networks 110a-110z.

An EIR terminal 100a-100z can establish a communication session with an external computer 171. In one embodiment, network frames can be exchanged by the EIR terminal 100 and the external computer 171 via one or more routers 140, access points 135, and other infrastructure elements. In another embodiment, the external computer 171 can be reachable by the EIR terminal 100 via a local area network (LAN). In a yet another embodiment, the external computer 171 can be reachable by the EIR terminal 100 via a wide area network (WAN). In a yet another embodiment, the external computer 171 can be reachable by the EIR terminal 100 directly (e.g., via a wired or wireless interface). A skilled artisan would appreciate the fact that other methods of providing interconnectivity between the EIR terminal 100 and the external computer 171 relying upon LANs, WANs, virtual private networks (VPNs), and/or other types of network are within the scope of this disclosure.

A "computer" herein shall refer to a programmable device for data processing and control, including a central processing unit (CPU), a memory, and at least one communication interface. For example, in one embodiment, a computer can be provided by a server running a single instance of a multi-tasking operating system. In another embodiment, a computer can be provided by a virtual server, i.e., an isolated instance of a guest operating system running within a host operating system. A "network" herein shall refer to a set of hardware and software components implementing a plurality of communication channels between two or more computers. A network can be provided, e.g., by a local area network (LAN), or a wide area network (WAN). While different networks can be designated herein, it is recognized that a single network as seen from the application layer interface to the network layer of the OSI model can comprise a plurality of lower layer networks, i.e., what can be regarded as a single Internet Protocol (IP) network, can include a plurality of different physical networks.

The communications between the EIR terminal 100 and the external computer 171 can comprise a series of requests and responses transmitted over one or more TCP connections. A skilled artisan would appreciate the fact that using various transport and application level protocols is within the scope and the spirit of the invention.

At least one of the messages transmitted by EIR terminal 100 can include the imaging assembly type identifier. For example, EIR terminal 100 can transmit a request to the external computer to retrieve imaging assembly configuration information corresponding to the imaging assembly type identifier identifying the imaging assembly currently plugged into EIR terminal 100.

Figure 5:
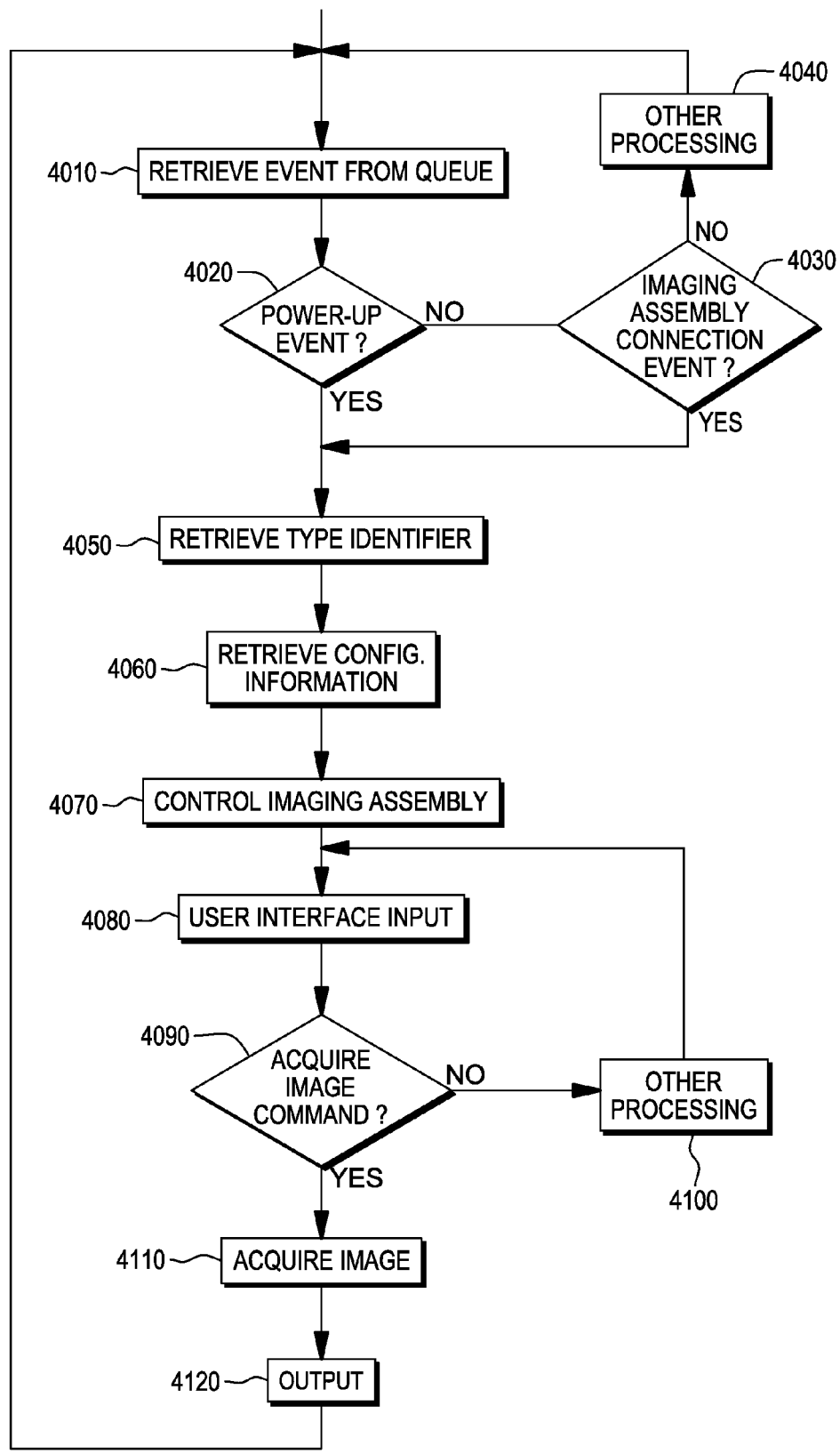
FIG. 5 depicts a flowchart of one embodiment of a method of controlling a pluggable imaging assembly by the EIR terminal described herein.

One embodiment of a method of controlling a pluggable imaging assembly by EIR terminal 100 is now being described with references to FIG. 5.

Responsive to detecting, within the event processing loop 4010-4040, a power-up event or an imaging assembly connection event, EIR terminal 100 can, at step 4050, receive imaging assembly type identifier over the imaging assembly interface as described in details herein supra.

At step 4060, EIR terminal 100 can retrieve the imaging assembly configuration information corresponding to the imaging assembly type identifier. In one embodiment, EIR terminal 100 can retrieve the imaging assembly configuration information from the memory of EIR terminal 100. Alternatively, EIR terminal 100 can transmit to an external computer a request comprising the imaging assembly type identifier, and receive the imaging assembly configuration information from the external computer.

At step 4070, EIR terminal 100 can control the imaging assembly using the received configuration information.

Responsive to detecting, within the user interface input loop 4080-4100, an acquire image user interface command, EIR terminal 100 can, at step 4100, acquire an image comprising decodable indicia using the imaging assembly.

At step 4420, EIR terminal 100 can output raw image data and/or decoded message corresponding to the decodable indicia.

Upon completing step 4420, the method can loop back to the event processing loop 4010-4040.

While the present invention has been described with reference to a number of specific embodiments, it will be understood that the true spirit and scope of the invention should be determined only with respect to claims that can be supported by the present specification. Further, while in numerous cases herein wherein systems and apparatuses and methods are described as having a certain number of elements it will be understood that such systems, apparatuses and methods can be practiced with fewer than the mentioned certain number of elements. Also, while a number of particular embodiments have been described, it will be understood that features and aspects that have been described with reference to each particular embodiment can be used with each remaining particularly described embodiment.

A sample of systems and methods that are described herein follows:

A1. An encoded information reading (EIR) terminal comprising:
a microprocessor communicatively coupled to a system bus;
a memory;
a communication interface;
a pluggable imaging assembly identified by a type identifier and configured to acquire an image comprising decodable indicia, said imaging assembly comprising a two-dimensional image sensor configured to output an analog signal representative of light reflected by an object located within a field of view of said imaging assembly;
wherein said EIR terminal is configured to output, by processing said analog signal, at least one of: raw image data derived from said analog signal, a decoded message corresponding to said decodable indicia;
wherein said imaging assembly is communicatively coupled to said system bus via an imaging assembly interface comprising a plurality of wires and a multi-pin connector;
wherein said imaging assembly interface comprises one or more wires configured to carry said type identifier;
wherein said EIR terminal is configured, responsive to receiving said type identifier via said one or more wires, to perform at least one of: retrieving from said memory one or more imaging assembly configuration information items corresponding to said type identifier, receiving via said communication interface one or more imaging assembly configuration information items corresponding to said type identifier; and
wherein said EIR terminal is further configured to control said imaging assembly using said one or more imaging assembly configuration information items.

A2. The EIR terminal of (A1), wherein said decoded message comprises at least one of: one or more printable characters, one or more non-printable characters.

A3. The EIR terminal of (A1), wherein said imaging assembly further comprises an analog-to-digital (A/D) converter configured to convert said analog signal into a digital signal, an amplifier configured to output an amplified analog signal by amplifying an analog signal read out of said image sensor, and a control circuit configured to control said imaging assembly.

A4. The EIR terminal of (A1), further configured to receive said type identifier via said one or more wires responsive to detecting one of: a power up event, an imaging assembly connection event.

A5. The EIR terminal of (A1), wherein said one or more wires configured to carry said type identifier are provided by an i2c interface.

A6. The EIR terminal of (A1), wherein said imaging assembly configuration items comprise at least one of: a power-up sequence of said two-dimensional image sensor, a format of data outputted by said two-dimensional image sensor, a number of pixels comprised by said two-dimensional image sensor, an exposure mode of said two-dimensional image sensor, configurations of one or more control registers of said two-dimensional image sensor.

A7. The EIR terminal of (A1), wherein said memory is provided by at least one of: a volatile memory, a non-volatile memory.

A8. The EIR terminal of (A1), wherein said communication interface is provided by one of: a wired communication interface, a wireless communication interface.

A9. The EIR terminal of (A1), further configured to store said one or more imaging assembly configuration items in a memory file comprising one or more records, each record comprising an image sensor type, at least one parameter identifier, and at least one parameter value.

B1. A method of controlling an imaging assembly by an EIR terminal comprising a microprocessor, a memory, a communication interface, and a pluggable imaging assembly communicatively coupled to said system bus via an imaging assembly interface comprising a plurality of wires and a multi-pin connector, said imaging assembly comprising a two-dimensional image sensor, said imaging assembly identified by a type identifier and configured to acquire an image comprising decodable indicia, said method comprising the steps of:

responsive to one of a power up event and an imaging assembly connection event, receiving said type identifier via said imaging assembly interface;

performing at least one of: retrieving from said memory one or more imaging assembly configuration information items corresponding to said type identifier, receiving via said communication interface one or more imaging assembly configuration information items corresponding to said type identifier;

controlling said imaging assembly using said one or more imaging assembly configuration information items;

responsive to receiving an analog signal outputted by said imaging assembly, converting said analog signal into a digital signal;

outputting, by processing said digital signal, at least one of: raw image data derived from said analog signal, a decoded message corresponding to said decodable indicia.

B2. The EIR method of (B1), wherein said decoded message comprises at least one of: one or more printable characters, one or more non-printable characters.

B3. The EIR method of (B1), wherein said imaging assembly further comprises an analog-to-digital (A/D) converter configured to convert said analog signal into a digital signal, an amplifier configured to output an amplified analog signal by amplifying an analog signal read out of said image sensor, and a control circuit configured to control said imaging assembly.

B4. The EIR method of (B1), wherein said imaging assembly configuration items comprise at least one of: a power-up sequence of said two-dimensional image sensor, a format of data outputted by said two-dimensional image sensor, a number of pixels comprised by said two-dimensional image sensor, an exposure mode of said two-dimensional image sensor, configurations of one or more control registers of said two-dimensional image sensor.

B5. The EIR method of (B1), wherein said memory is provided by at least one of: a volatile memory, a non-volatile memory.

B6. The EIR method of (B1), wherein said communication interface is provided by one of: a wired communication interface, a wireless communication interface.

B7. The EIR method of (B1), further comprising the step of storing said one or more imaging assembly configuration items in a memory file comprising one or more records, each record comprising an image sensor type, at least one parameter identifier, and at least one parameter value.

The invention claimed is:

1. An encoded information reading (EIR) terminal comprising:
   a microprocessor communicatively coupled to a system bus;
   a memory;
   a communication interface;
   a pluggable imaging assembly identified by a type identifier and configured to acquire an image comprising decodable indicia, said imaging assembly comprising a two-dimensional image sensor configured to output an analog signal representative of light reflected by an object located within a field of view of said imaging assembly;
   wherein said EIR terminal is configured to output, by processing said analog signal, at least one of: raw image data derived from said analog signal, a decoded message corresponding to said decodable indicia;
   wherein said imaging assembly is communicatively coupled to said system bus via an imaging assembly interface comprising a plurality of wires and a multi-pin connector;
   wherein said imaging assembly interface comprises one or more wires configured to carry said type identifier;
   wherein said EIR terminal is configured, responsive to receiving said type identifier via said one or more wires, to perform at least one of: retrieving from said memory one or more imaging assembly configuration information items corresponding to said type identifier, receiving via said communication interface one or more imaging assembly configuration information items corresponding to said type identifier; and
   wherein said EIR terminal is further configured to control said imaging assembly using said one or more imaging assembly configuration information items.

2. The EIR terminal of claim 1, wherein said decoded message comprises at least one of: one or more printable characters, one or more non-printable characters.

3. The EIR terminal of claim 1, wherein said imaging assembly further comprises an analog-to-digital (A/D) converter configured to convert said analog signal into a digital signal, an amplifier configured to output an amplified analog signal by amplifying an analog signal read out of said image sensor, and a control circuit configured to control said imaging assembly.

4. The EIR terminal of claim 1, further configured to receive said type identifier via said one or more wires responsive to detecting one of: a power up event, an imaging assembly connection event.

5. The EIR terminal of claim 1, wherein said one or more wires configured to carry said type identifier are provided by an i2c interface.

6. The EIR terminal of claim 1, wherein said imaging assembly configuration items comprise at least one of: a power-up sequence of said two-dimensional image sensor, a format of data outputted by said two-dimensional image sensor, a number of pixels comprised by said two-dimensional image sensor, an exposure mode of said two-dimensional image sensor, configurations of one or more control registers of said two-dimensional image sensor.

7. The EIR terminal of claim 1, wherein said memory is provided by at least one of: a volatile memory, a non-volatile memory.

8. The EIR terminal of claim 1, wherein said communication interface is provided by one of: a wired communication interface, a wireless communication interface.

9. The EIR terminal of claim 1, further configured to store said one or more imaging assembly configuration items in a memory file comprising one or more records, each record comprising an image sensor type, at least one parameter identifier, and at least one parameter value.

10. A method of controlling an imaging assembly by an EIR terminal comprising a microprocessor, a memory, a communication interface, and a pluggable imaging assembly communicatively coupled to said system bus via an imaging assembly interface comprising a plurality of wires and a multi-pin connector, said imaging assembly comprising a two-dimensional image sensor, said imaging assembly identified by a type identifier and configured to acquire an image comprising decodable indicia, said method comprising the steps of:

responsive to one of a power up event and an imaging assembly connection event, receiving said type identifier via said imaging assembly interface;

performing at least one of: retrieving from said memory one or more imaging assembly configuration information items corresponding to said type identifier, receiving via said communication interface one or more imaging assembly configuration information items corresponding to said type identifier;

controlling said imaging assembly using said one or more imaging assembly configuration information items;

responsive to receiving an analog signal outputted by said imaging assembly, converting said analog signal into a digital signal;

outputting, by processing said digital signal, at least one of: raw image data derived from said analog signal, a decoded message corresponding to said decodable indicia.

11. The EIR method of claim 10, wherein said decoded message comprises at least one of: one or more printable characters, one or more non-printable characters.

12. The EIR method of claim 10, wherein said imaging assembly further comprises an analog-to-digital (A/D) converter configured to convert said analog signal into a digital signal, an amplifier configured to output an amplified analog signal by amplifying an analog signal read out of said image sensor, and a control circuit configured to control said imaging assembly.

13. The EIR method of claim 10, wherein said imaging assembly configuration items comprise at least one of: a power-up sequence of said two-dimensional image sensor, a format of data outputted by said two-dimensional image sensor, a number of pixels comprised by said two-dimensional image sensor, an exposure mode of said two-dimensional image sensor, configurations of one or more control registers of said two-dimensional image sensor.

14. The EIR method of claim 10, wherein said memory is provided by at least one of: a volatile memory, a non-volatile memory.

15. The EIR method of claim 10, wherein said communication interface is provided by one of: a wired communication interface, a wireless communication interface.

16. The EIR method of claim 10, further comprising the step of storing said one or more imaging assembly configuration items in a memory file comprising one or more records, each record comprising an image sensor type, at least one parameter identifier, and at least one parameter value.

* * * * *